US008033554B2

(12) United States Patent
Vieira et al.

(10) Patent No.: US 8,033,554 B2
(45) Date of Patent: Oct. 11, 2011

(54) STROLLER SYSTEM

(75) Inventors: Michael C. Vieira, Fall River, MA (US);
Trung Q. Phung, Roslindale, MA (US);
Robert D. Monahan, Norwell, MA (US)

(73) Assignee: Monahan Products, LLC, Hingham, MA (US)

( * ) Notice: Subject to any disclaimer, the term of this patent is extended or adjusted under 35 U.S.C. 154(b) by 372 days.

(21) Appl. No.: 12/336,643

(22) Filed: Dec. 17, 2008

(65) Prior Publication Data

US 2010/0148473 A1 Jun. 17, 2010

(51) Int. Cl.
*B62B 7/14* (2006.01)
(52) U.S. Cl. ............... 280/47.38; 280/47.34; 280/47.39
(58) Field of Classification Search .................. 280/642, 280/643, 647, 648, 650, 657, 658, 638, 639, 280/47.34, 47.38, 47.39
See application file for complete search history.

(56) References Cited

U.S. PATENT DOCUMENTS 4,753,453 A * 6/1988 Schilbach .................. 280/643
4,779,883 A 10/1988 Paduano et al.
2002/0036391 A1 3/2002 Sweeney et al.
2007/0069505 A1 * 3/2007 Li .............................. 280/642
2007/0187914 A1 * 8/2007 Jane Santamaria ........ 280/47.38

FOREIGN PATENT DOCUMENTS

CH 322 851 6/1957
GB 2 367 488 4/2002

OTHER PUBLICATIONS

International Search Report, PCT Application No. PCT/US09/057427, dated Dec. 29, 2009.

* cited by examiner

*Primary Examiner* — J. Allen Shriver, II
*Assistant Examiner* — Bryan Evans
(74) *Attorney, Agent, or Firm* — Lando & Anastasi, LLP (57) ABSTRACT

A stroller system includes a stroller frame and a seat system. The stroller frame includes first and second frame supports spaced apart from each other, at least one third frame support attaching the first frame support to the second frame support, and wheels rotatably attached to one or more of the frame supports. The seat system is removably attached to the stroller frame and includes a seat support having first and second end portions, and first and second end connectors disposed on the corresponding first and second end portions of the seat support. Each end connector includes a connector body having first and second end portions, where each end portion defines a recess configured to receive one of the frame supports. The recesses arranged substantially in opposition to engage the received support in substantially opposing directions.

21 Claims, 8 Drawing Sheets

STROLLER SYSTEM

TECHNICAL FIELD

This disclosure relates to strollers.

BACKGROUND

A stroller is generally a chair-like carriage, often collapsible, with four wheels for transporting a baby or child. A baby or child generally sits or reclines in a seat of the stroller as a user (e.g., parent) propels the stroller in a desired direction. Strollers typically include a single seat for receiving a single passenger for transporting. However, some strollers include two seats, either side-by-side or forward and aft of each other, and are typically used for twins or two children still of age in need of the stroller. However, when a second seat is no longer needed or desired, the stroller may become no longer functional for its new purpose of transporting a single child. Conversely, a single seat stroller may no longer be desired when there exists a need to transport two children at once.

SUMMARY

The present disclosure provides a stroller system that includes a seat system removably attached to a stroller frame, thereby offering additional seating capacity to a stroller.

In one aspect, a stroller system includes a stroller frame and a seat system. The stroller frame includes first and second frame supports spaced apart from each other, an optional at least one third frame support attaching the first frame support to the second frame support, and wheels rotatably attached to one or more of the frame supports. The seat system is removably attached to the stroller frame and includes a seat support having first and second end portions, and first and second end connectors disposed on the corresponding first and second end portions of the seat support. Each end connector includes a connector body having first and second end portions, where each end portion defines a recess configured to receive one of the frame supports. The recesses arranged substantially in opposition to engage the received support in substantially opposing directions.

In some implementations, the stroller frame includes fourth and fifth frame supports, each having first and second end portions. The first end portions of the fourth and fifth supports are rotatably coupled to the first and second frame supports, respectively. The fourth and fifth supports are movable between a stowed position substantially parallel with the first and second supports and a deployed position at an angle with respect to the first and second supports. One of the wheels is rotatably attached to the second end portion of each of the fourth and fifth frame supports. In some examples, the first and second frame supports are disposed on a forward portion of the stroller frame for receipt of the seat system in a forward position on the stroller frame.

In another aspect, a seat system for a stroller includes a seat support having first and second end portions, and first and second end connectors disposed on the corresponding first and second end portions of the seat support. Each end connector includes a connector body having first and second end portions. Each end portion defines a recess configured to receive one of the frame supports, and the recesses are arranged substantially in opposition to engage the received support in substantially opposing directions.

Implementations of the disclosure may include one or more of the following features. In some implementations, each recess defines a substantially C-shape. In some examples, each recess defines a substantially semi-circular cross-sectional shape for partially circumscribing the received frame support. Each recess may be configured to have an interference fit with the received frame support. In some implementations, the seat support defines a substantially U-shape from a top view. Each end connector may include a support rest configured to receive a stabilizer on the received frame support. In some examples, the stabilizer includes a stroller frame support, such as the at least one third frame support of the exemplary stroller frame. The seat support may include an adjustable portion configured to allow alteration of the overall geometry of the seat support. This allows the seat system to be attached to a variety of strollers. In some examples, the adjustable portion of the seat support includes a telescopic portion and/or a pivot for allowing movement of the first and second end portions of the seat support relative to one another.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 8 is a top view of a seat system.
Like reference symbols in the various drawings indicate like elements.

DETAILED DESCRIPTION

Figure 1:
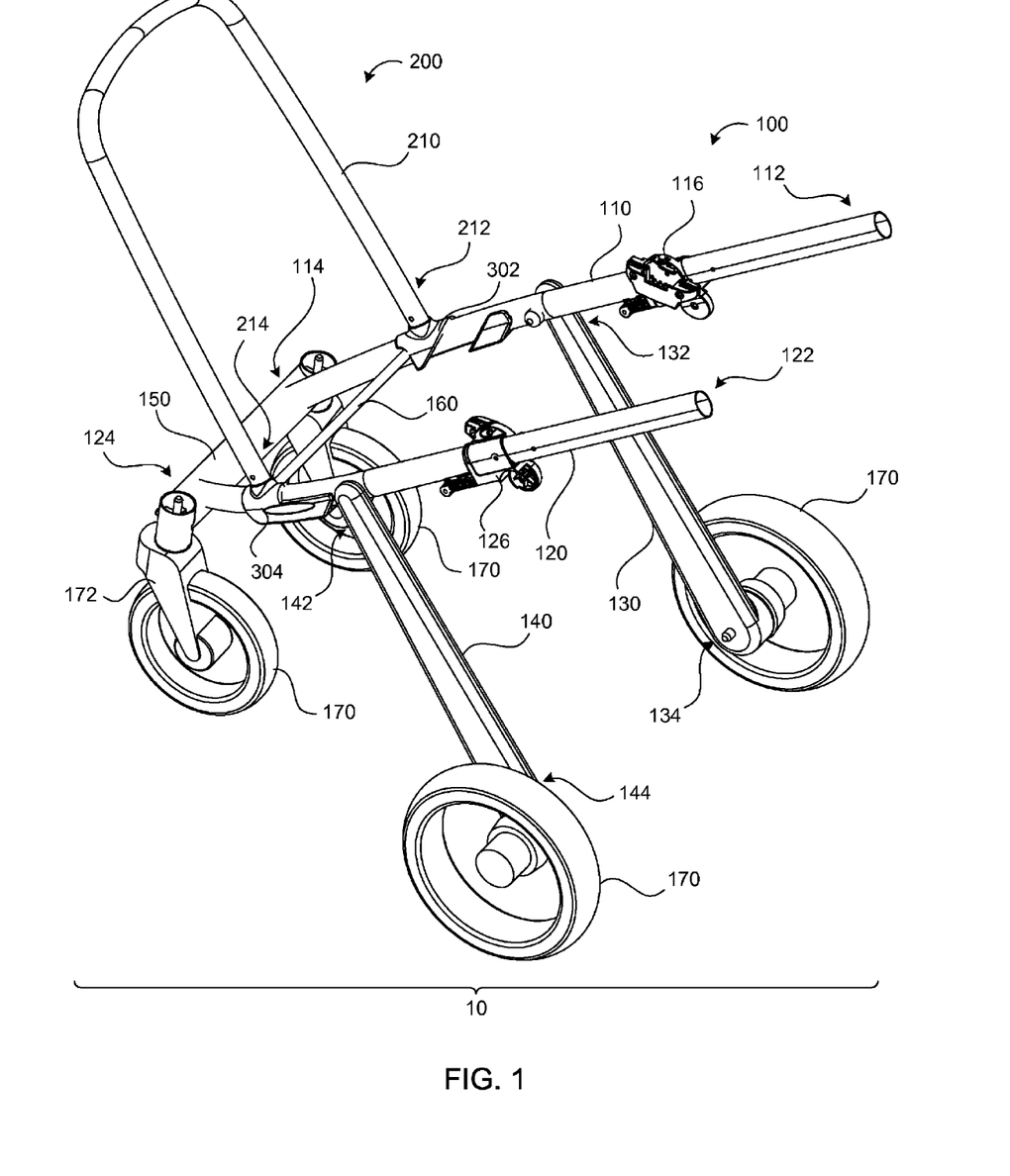
FIG. 1 is a rear perspective view of a stroller system.
Figure 2:
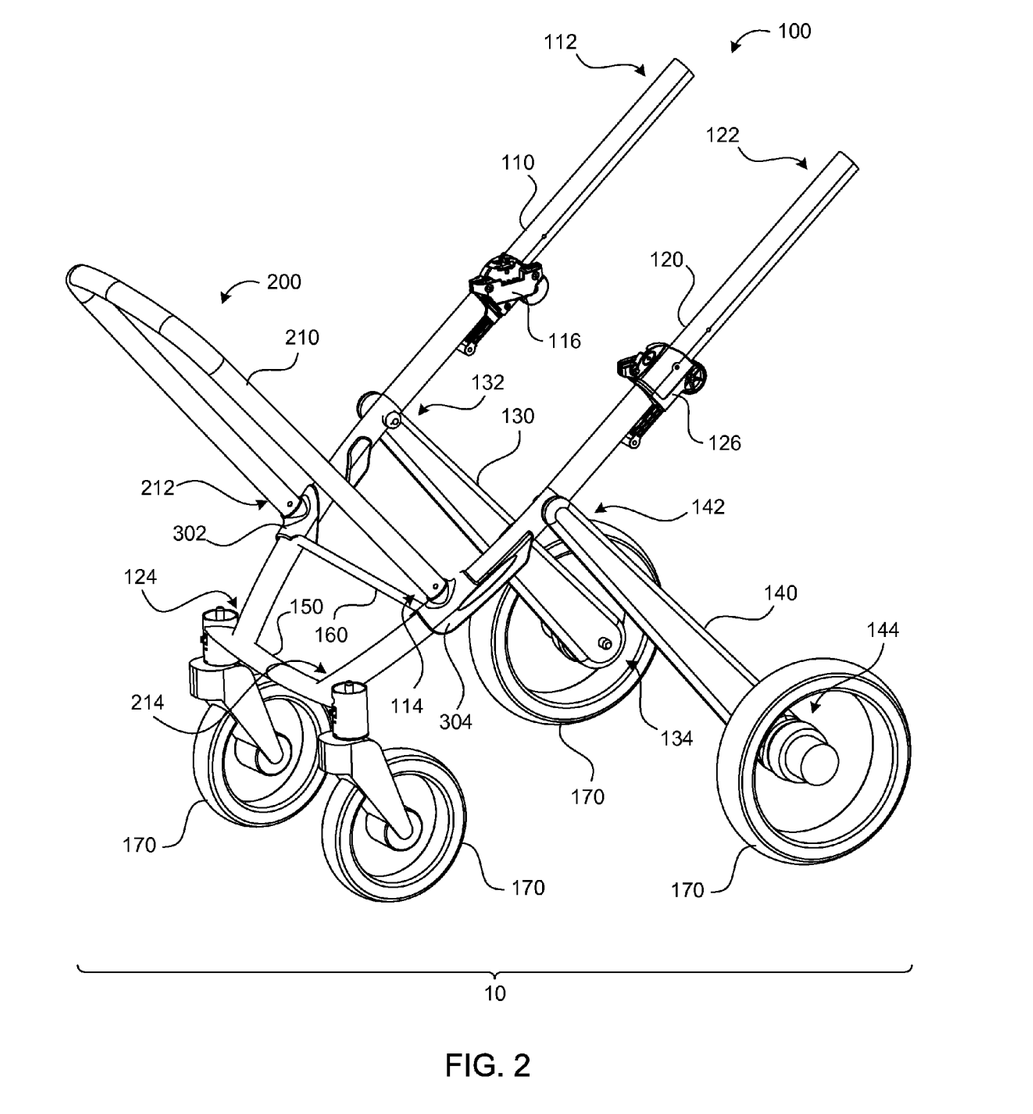
FIG. 2 is a front perspective view of a stroller system.
Figure 3:
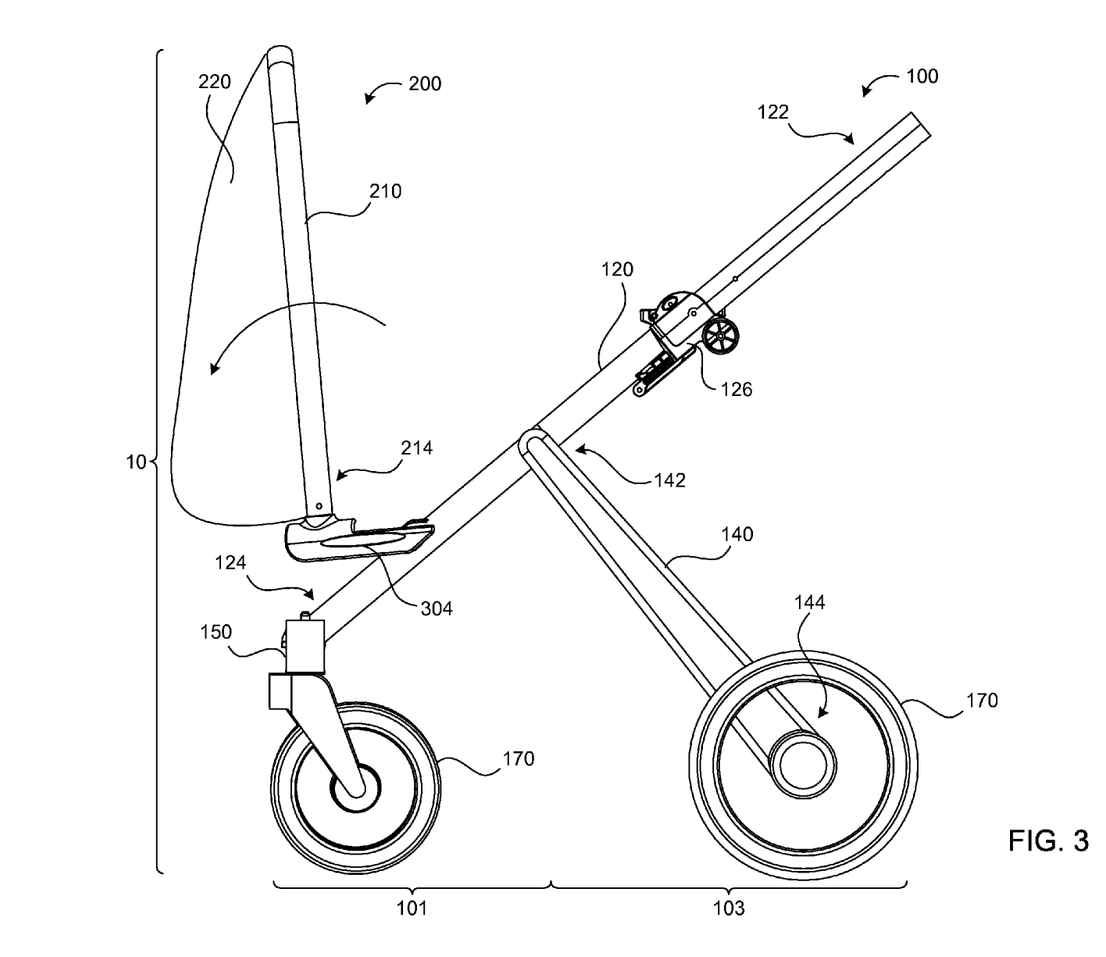
FIG. 3 is a side view of a stroller system.
Figure 4:
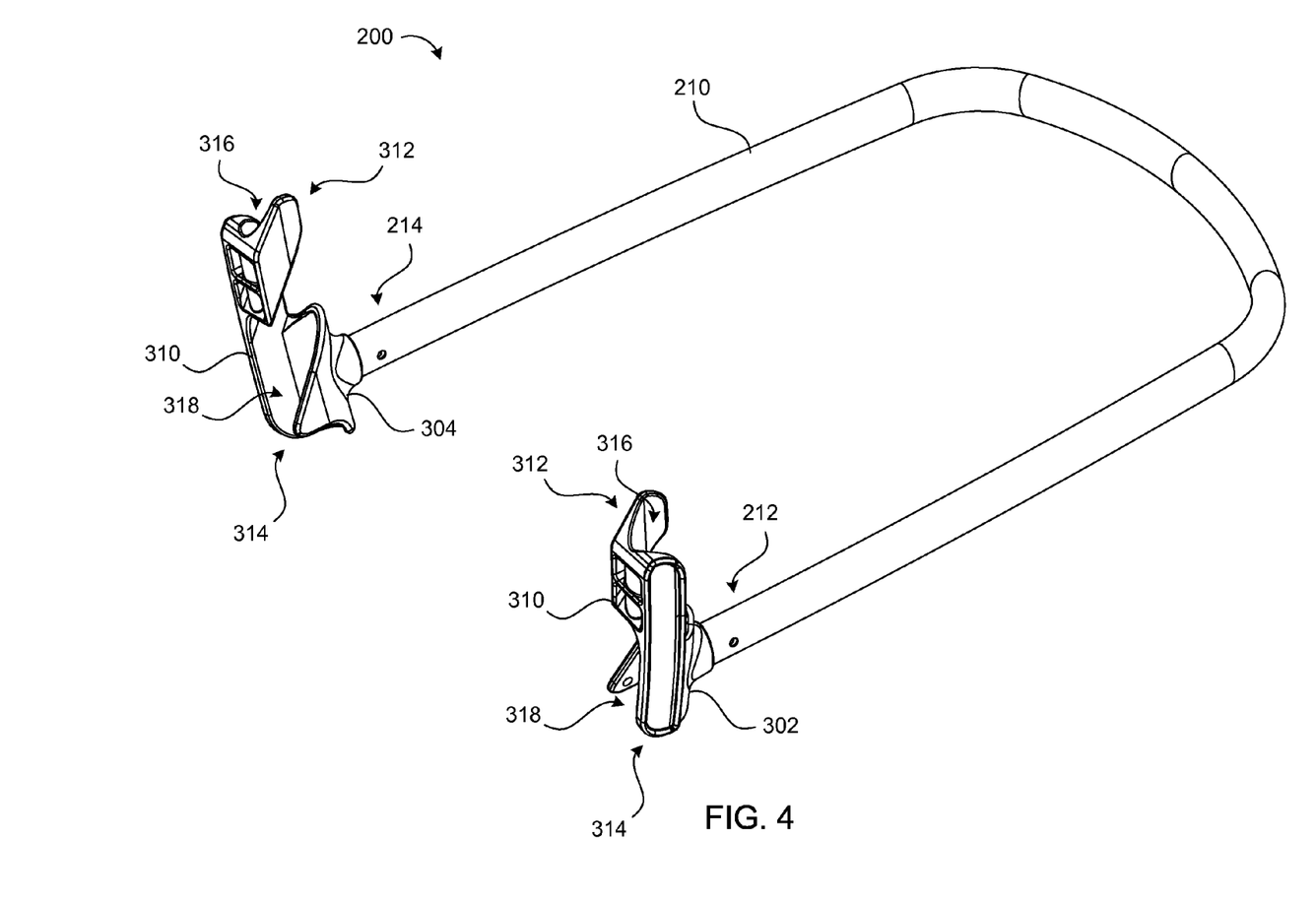
FIG. 4 is a top perspective view of a seat system.
Figure 5:
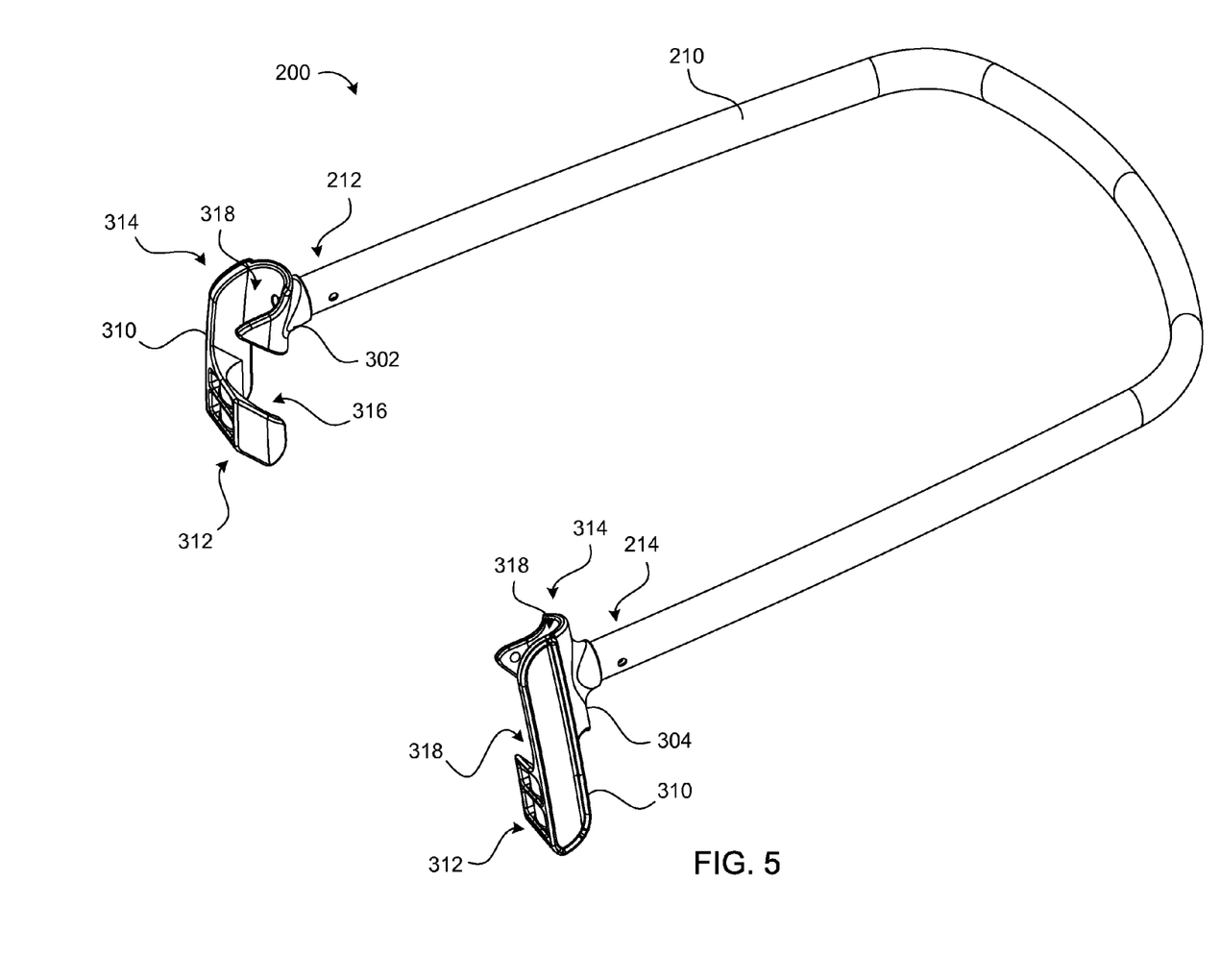
FIG. 5 is a bottom perspective view of a seat system.
Figure 6:
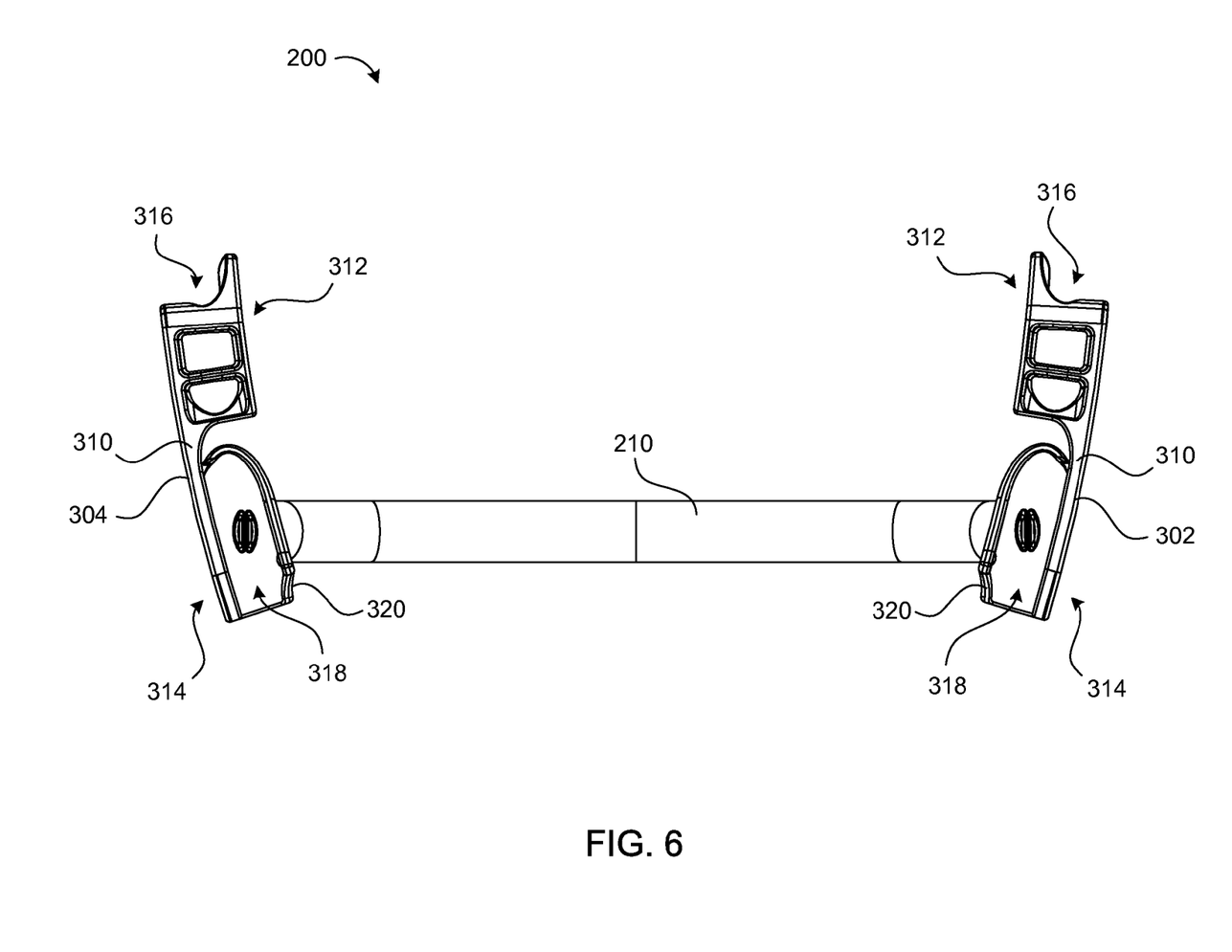
FIG. 6 is a bottom view of a seat system.
Figure 7:
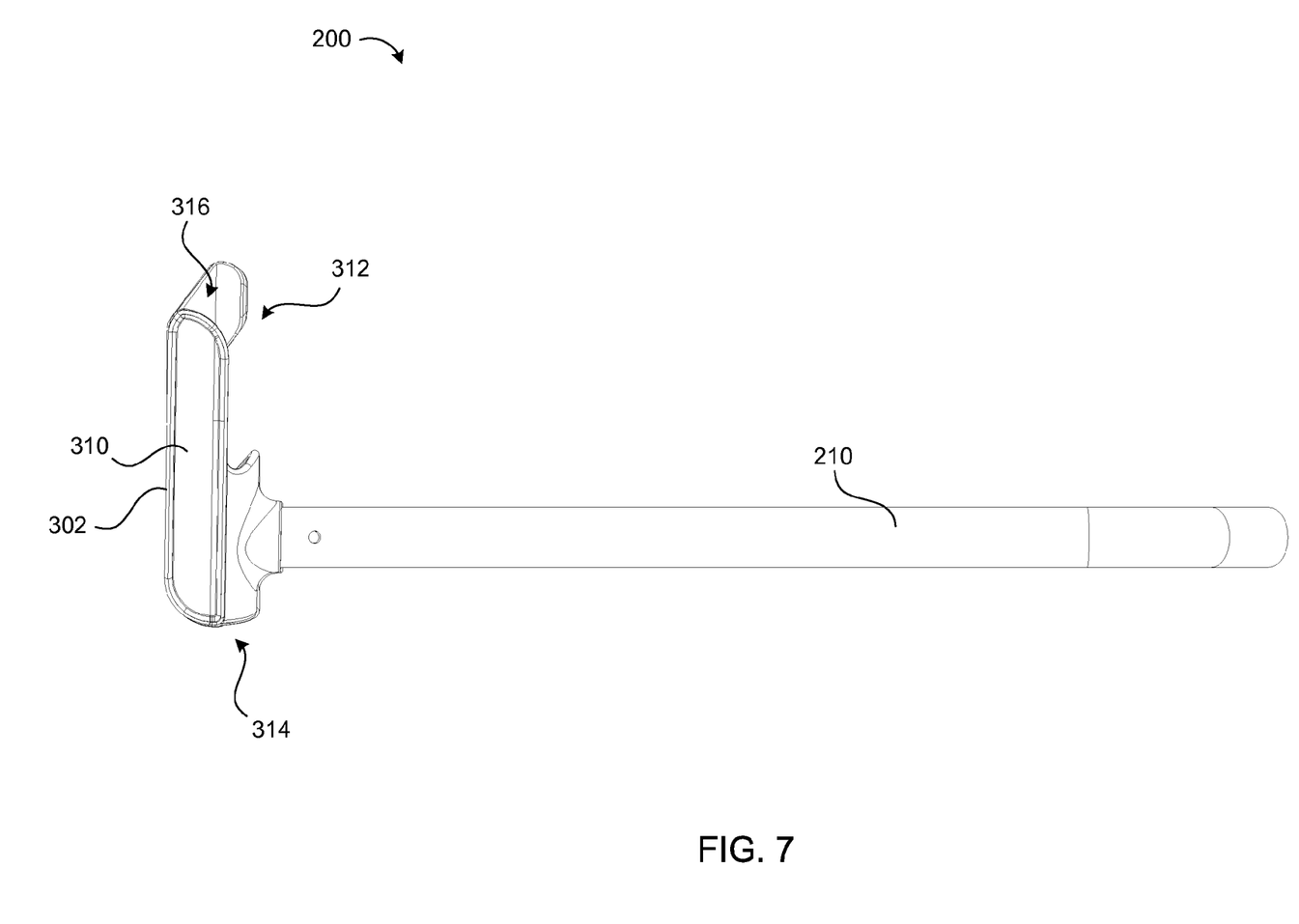
FIG. 7 is a side view of a seat system.

Referring to FIGS. 1-3, in some implementations, a stroller system 10 includes a stroller frame 100 and a seat system 200 releasably attached to the stroller frame 100 for providing additional removable seating capacity to the stroller frame 100. The seat system 200 may be adjustable or otherwise adaptable to be received by various types of strollers. The exemplary stroller frame 100 shown includes first and second supports 110, 120, each having a first end 112, 122 and a second end 114, 124. Third and fourth supports 130, 140 each have a first end 132, 142 and a second end 134, 144, with the first ends 132, 142 rotatably attached to the respective first and second supports 110, 120. The third and fourth supports 130, 140 pivot between a deployed position (as shown) to provide a four point ground contact configuration and a stowed position, in which the third and fourth supports 130, 140 are adjacent, next to, or substantially parallel with the respective first and second supports 110, 120. The first and second supports 110, 120 are spaced apart substantially parallel or angled to each other, and a fifth support 150 is attached to the second ends 114, 124 of the first and second supports 110, 120. An optional sixth support 160 may be attached to the first and second supports 110, 120 to provide additional rigidity of the overall stroller frame 100. Wheels 170 may be attached to the second ends 114, 124 of the first and second supports 110, 120 or to the fifth support 150 as shown. In the example shown, the wheels 172 are caster wheels to provide steerability of the stroller frame 100. Wheels 170 are also attached to the second ends 134, 144 of the third and fourth supports 130, 140. A primary seat (not shown), such as a baby seat or toddler seat, may be removably attached to the first and second supports 110, 120. In the example shown, first and second seat receivers 116, 126 are disposed on the respective first and second supports 110, 120 and configured to receive and hold mating members of the primary seat. In some examples, the primary seat is permanently attached to the stroller frame 100.

Referring to FIGS. 4-8, in some implementations, the seat system 200 includes a seat support 210 having first and second end portions 212, 214. The exemplary seat support 210 shown defines a substantially U-shape from a top view; however, other shapes and configurations are possible, such as M-shaped, etc. A seat 220 (shown in FIG. 3) is attached to the seat support 210 and configured to receive a child or infant. The seat 220 may be constructed from cloth, plastic, or any other suitable material. In the example shown, the seat 220 comprises a nylon woven fabric secured to the seat support 210 by fasteners (e.g., via stitching, adhesive, snaps, hook and loop fasteners, etc.). First and second end connectors 302, 304 are attached to the corresponding first and second end portions 212, 214. In some implementations, the first and second end connectors 302, 304 are removably attached (e.g., via snap fit, threaded connection, locking-pin, fastener, etc.) to the corresponding first and second end portions 212, 214. In some examples, the first and second end connectors 302, 304 are mirror images of each other. Each end connectors 302, 304 includes a connector body 310 having first and second end portions 312, 314. Each end portions 312, 314 defines a respective recess 316, 318 configured to receive a frame support (e.g., the first and second supports 110, 120) of the stroller frame 100. The end portions 312, 314 are arranged substantially in opposition of each other to provide a counteracting engagement of a received stroller frame support.

The seat system 200 is attached to two stroller frame supports. Referring again to FIGS. 1-3, the seat system 200 is received by the exemplary stroller frame 100 by positioning the first and second end connectors 302, 304 over the first and second frame supports 110, 120 spaced to receive the seat system 200. The first end portions 212 of the first and second end connectors 302, 304 are placed to receive the first and second frame supports 110, 120 in their respective recesses 316 (e.g., an opening in a substantially tubular structure). The seat system 200 is rotated causing the end connectors 302, 304 to pivot about their first end portions 212 toward the respective first and second frame supports 110, 120 until the second end portions 214 of the first and second end connectors 302, 304 engage and receive the first and second frame supports 110, 120 in the respective recesses 318 of the second end portions 214 of the first and second end connectors 302, 304, thereby securing the seat system 200 to the first and second frame supports 110, 120. The seat support 210 is cantilevered from the first and second frame supports 110, 120. A child received in the seat 220 causes the seat support 210 to try to rotate downward about the second end portions 214 of the first and second end connectors 302, 304 until the first end portions 212 of the first and second end connectors 302, 304 engage the frame supports 110, 120 to inhibit rotation, thereby cinching, locking, or otherwise immobilizing the seat support 210 in place.

Referring to FIG. 3, in some implementations, the seat system 200 is specifically adapted for attachment to a forward portion 101 of the received stroller frame 100. Although, in other implementations, the seat system 200 may be attached to a rearward portion 103 of the stroller frame 100 as well or instead. In the example shown, the first and second frame supports 110, 120 are disposed on the forward portion 101 of the stroller frame 100 for receipt of the seat system in a relative forward position on the stroller frame 100. The rearward-facing seat system 200 cantilevered off the forward portion 101 of the stroller frame 100 allows transportation of a child in a convenient location within the oversight of a user (e.g., parent or caregiver). Furthermore, the front side attachment of the seat system 200 to the forward portion 101 of the stroller frame 100 provides ergonomic ease of use, as by allowing attachment to an upwardly facing portion of the stroller frame 100, for example. In the example of rear side attachment to the rearward portion 103 of the stroller frame 100, the seat support 210 as well as the first and second end connectors 302, 304 are configured for attachment to the third and fourth supports 130, 140 in their deployed position. The method of attachment is the same or substantially similar to that for attachment to the forward portion 101 of the stroller frame 100, thus providing multiple seating configurations of the stroller system 10. The seat system 200 may be disposed forward-facing with rear-side attachment to the stroller frame 100.

In the examples shown, the recesses 316, 318 are substantially semi-circular or C-shaped for receiving a tubular stroller frame support therein and partially circumscribing the tubular stroller frame support in an end view. In some examples, the recesses 316, 318 are substantially semi-circular or U-shaped. The recesses 316, 318 may define other shapes as well, such as elliptical or polygonal shapes, to receive either similar or non-similar cross-sectionally shaped frame supports. The recesses 316, 318 are also arranged substantially in opposition of each other to engage the received stroller frame support in substantially opposing directions for inhibiting rotation of the seat system 200 along one direction. The recesses 316, 318 may be sized to provide an interference fit with the received stroller frame support to increase friction therebetween and prevent sliding the end connector body 310 along the received stroller frame.

Figure 8:
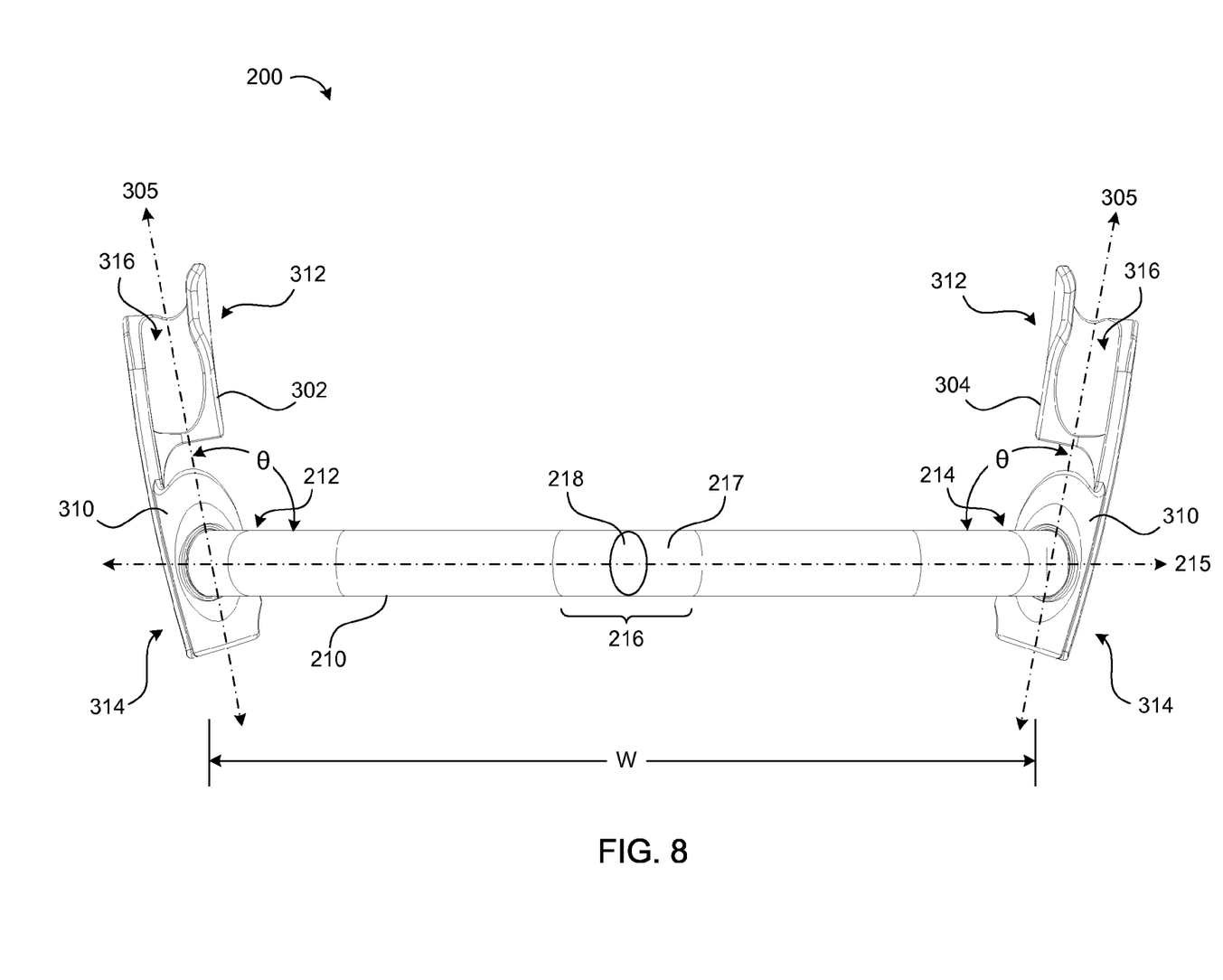

In the example shown in FIG. 8, each end connector 302, 304 is disposed at an angle with respect to each other for receiving similarly angled stroller frame supports. The end connector body 310 defines a longitudinal axis 305. The connector body 310 of each end connector 302, 304 is disposed at an angle θ (e.g., between about 90° and 180°, preferably between about 100° and about 120°) between its longitudinal axis 305 and a lateral axis 215 defined by the seat support. In this case, at least a portion of the first and second frame supports 110, 120 are angled toward each other and the end connectors 302, 304 are similarly angled with respect to the lateral axis 215 of the seat support 210 to receive the first and second frame supports 110, 120. Once the end connectors 302, 304 are received by the first and second frame supports 110, 120, the end connectors 302, 304 may be moved into a position that provides a snug fit therebetween.

In some examples, the end connector body 310 includes a support rest 320 (FIG. 6) configured to receive a stabilizer, such as cross support (e.g., the sixth support 160 of the exemplary stroller frame 100) or a protrusion (not shown) on the received frame support. The support rest 320 receives the sixth support 160, as shown in FIGS. 1 and 2, for preventing the end connector 302, 304 from sliding down the received frame support 110, 120 past the sixth support.

To accommodate a variety of stroller frames, in some implementations, the seat support 210 includes an adjustable portion 216, as shown in FIG. 8, configured for modification of the geometry of the seat support 210. In some examples, the adjustable portion 216 includes a telescoping portion 217 for adjusting an overall width, W, of the seat support 210, thereby allowing attachment of the seat system 200 on various width strollers. The adjustable portion 216 may also include a pivot 218 that allows movement of the first and second end portions 212, 214 of the seat support relative to each other for adaptation of the seat support 210 to allow attachment of the seat system 200 onto various configurations of stroller frames.

A number of implementations have been described. Nevertheless, it will be understood that various modifications may be made without departing from the spirit and scope of the disclosure. Accordingly, other implementations are within the scope of the following claims.

What is claimed is:

1. A stroller system comprising:
   a stroller frame comprising:
      a first stroller frame support and a second stroller frame support spaced apart from each other;
      a third stroller frame support attaching the first stroller frame support to the second stroller frame support; and
      wheels rotatably attached to one or more of the first stroller frame support, the second stroller frame support, and the third stroller frame support; and
   a seat system removably attached to the stroller frame, the seat system including:
      a seat support having a first support end portion and a second support end portion;
      a first end connector disposed on the first support end portion; and
      a second end connector disposed on the second support end portion,
      the first end connector comprising a first end connector body having a first connector body end portion and a second connector body end portion, the first connector body end portion defining a first recess configured to receive the first stroller frame support and the second connector body end portion defining a second recess configured to receive the first stroller frame support, the first recess and the second recess arranged substantially in opposition to engage the first stroller frame support in substantially opposing directions,
      the second end connector comprising a second end connector body having a third connector body end portion and a fourth connector body end portion, the third connector body end portion defining a third recess configured to receive the second stroller frame support and the fourth connector body end portion defining a fourth recess configured to receive the second stroller frame support, the third recess and the fourth recess arranged substantially in opposition to engage the second stroller frame support in substantially opposing directions.

2. The stroller system of claim 1, wherein each of the first recess and the second recess are substantially C-shaped.

3. The stroller system of claim 2, wherein each of the first recess and the second recess define a substantially semi-circular cross-sectional shape configured to partially circumscribe the first frame support.

4. The stroller system of claim 1, wherein each of the first recess and the second recess is configured to have an interference fit with the first frame support.

5. The stroller system of claim 1, wherein the seat support defines a substantially U-shape from a top view.

6. The stroller system of claim 1, wherein at least one of the first end connector and the second end connector includes a support rest configured to receive a stabilizer on one of the first frame support and the second frame support.

7. The stroller system of claim 6, wherein the stabilizer comprises the third stroller frame support.

8. The stroller system of claim 1, wherein the seat support comprises an adjustable portion configured to allow alteration of the overall geometry of the seat support.

9. The stroller system of claim 8, wherein the adjustable portion of the seat support comprises a telescopic portion.

10. The stroller system of claim 8, wherein the adjustable portion of the seat support comprises a pivot configured to provide for movement of the first support end portion and the second support end portion of the seat support relative to one another.

11. The stroller system of claim 1, wherein the first frame support and the second frame support are disposed on a forward portion of the stroller frame for receipt of the seat system in a forward position on the stroller frame.

12. A seat system for a stroller, the seat system comprising:
   a seat support having a first support end portion and a second support end portion;
   a first end connector disposed on the first support end portion; and
   a second end connector disposed on the second support end portion,
   the first end connector comprising a first end connector body having a first connector body end portion and a second connector body end portion, the first connector body end portion defining a first recess configured to receive a first stroller frame support and the second connector body end portion defining a second recess configured to receive the first stroller frame support, the first recess and the second recess arranged substantially in opposition to engage the first stroller frame support in substantially opposing directions;
   the second end connector comprising a second end connector body having a third connector body end portion and a fourth connector body end portion, the third connector body end portion defining a third recess configured to receive a second stroller frame support and the fourth connector body end portion defining a fourth recess configured to receive the second stroller frame support, the third recess and the fourth recess arranged substantially in opposition to engage the second stroller frame support in substantially opposing directions.

13. The seat system of claim 12, wherein each of the first recess, the second recess, the third recess, and the fourth recess are substantially C-shaped.

14. The seat system of claim 13, wherein each of the first recess and the second recess defines a substantially semi-circular cross-sectional shape configured to partially circumscribe the first frame support and wherein each of the third recess and the fourth recess defines a substantially semi-circular cross-sectional shape configured to partially circumscribe the second frame support.

15. The seat system of claim 12, wherein each of the first recess and the second recess is configured to have an interference fit with the first frame support, and wherein each of the third recess and the fourth recess is configured to have an interference fit with the second frame support.

16. The seat system of claim 12, wherein the seat support defines a substantially U-shape from a top view.

17. The seat system of claim 12, wherein one of the first end connector and the second end connector includes a support rest configured to receive a stabilizer on one of the first frame support and the second frame support.

18. The seat system of claim 17, wherein the stabilizer comprises a third frame support.

19. The seat system of claim 12, wherein the seat support comprises an adjustable portion configured to allow alteration of the overall geometry of the seat support.

20. The seat system of claim 19, wherein the adjustable portion of the seat support comprises a telescopic portion.

21. The seat system of claim 19, wherein the adjustable portion of the seat support comprises a pivot configured to provide for movement of the first end portion and the second end portion of the seat support relative to one another.

\* \* \* \* \*